United States Patent
Spotnitz et al.

(10) Patent No.: US 10,014,517 B2
(45) Date of Patent: Jul. 3, 2018

(54) THREE DIMENSIONAL BATTERIES AND METHODS OF MANUFACTURING THE SAME

(71) Applicant: Enovix Corporation, Fremont, CA (US)

(72) Inventors: Robert M. Spotnitz, Pleasanton, CA (US); Venkat Srinivasan, Fremont, CA (US)

(73) Assignee: ENOVIX CORPORATION, Fremont, CA (US)

( * ) Notice: Subject to any disclaimer, the term of this patent is extended or adjusted under 35 U.S.C. 154(b) by 144 days.

(21) Appl. No.: 14/186,503

(22) Filed: Feb. 21, 2014

(65) Prior Publication Data

US 2014/0170466 A1 Jun. 19, 2014

Related U.S. Application Data

(60) Division of application No. 12/536,154, filed on Aug. 5, 2009, now Pat. No. 8,691,450, which is a (Continued)

(51) Int. Cl.
*H01M 4/13* (2010.01)
*H01M 6/40* (2006.01)
(Continued)

(52) U.S. Cl.
CPC ........... *H01M 4/13* (2013.01); *H01M 4/0414* (2013.01); *H01M 4/134* (2013.01); *H01M 6/40* (2013.01);
(Continued)

(58) Field of Classification Search
CPC ...... H01M 66/30; H01M 4/13; H01M 4/0414; H01M 4/134; H01M 4/0423;
(Continued)

(56) References Cited

U.S. PATENT DOCUMENTS 4,113,579 A 2/1978 Randall
4,820,599 A 4/1989 Furukawa et al.
(Continued)

FOREIGN PATENT DOCUMENTS

CA 02388711 5/2001
CN 1555588 12/2004
(Continued)

OTHER PUBLICATIONS

Golodnitsky et al., Advanced materials for the 3D microbattery, 2006, Journal of Power Sources, 153, 281-287.
(Continued)

*Primary Examiner* — Stephen J Yanchuk
(74) *Attorney, Agent, or Firm* — Bryan Cave Leighton Paisner LLP

(57) ABSTRACT

Various methods and apparatus relating to three-dimensional battery structures and methods of manufacturing them are disclosed and claimed. In certain embodiments, a three-dimensional battery comprises a plurality of non-laminar, three-dimensional electrodes including a plurality of cathodes and a plurality of silicon anodes; and an electrolyte solution in fluid contact with the plurality of electrodes, wherein the electrolyte solution comprises a selected one of lithium (bis)trifluoromethanesulfonimide (LiTFSI), LiClO$_4$, LiCF$_3$SO$_3$, and LiBOB. In certain embodiments, a three-dimensional battery comprises a plurality of electrodes including a plurality of cathodes and a plurality of silicon anodes, wherein either the plurality of cathodes or the plurality of silicon anodes are non-laminar, three-dimensional electrodes; and an electrolyte solution in fluid contact with the plurality of electrodes, wherein the electrolyte solution comprises a salt selected from LiTFSI, LiClO$_4$, LiCF$_3$SO$_3$, and LiBOB. In certain embodiments, a three-dimensional battery comprises a battery enclosure, and a
(Continued)

| Exp # | Code | Solvents | Salt | Max 1st Cycle Current microamperes |
|---|---|---|---|---|
| 1a,b | MA1 | PC | LiPF6 | 200 |
| 2a,b | MA2 | PC | TFSI | 500 |
| 3a | MA3 | EC:DEC | TFSI | 500 |
| 3b | MA3 | EC:DEC | TFSI | 300 |
| 3c | MA3 | EC:DEC | TFSI | 500 |
| 3d | MA3 | EC:DEC | TFSI | 500 |
| 4a | MA4 | EC:DEC:FEC | LiPF6 | 250 |
| 4b | MA4 | EC:DEC:FEC | LiPF6 | 250 |
| 5a | MA5 | PC:DEC:FEC | LiPF6 | 150 |
| 5b | MA5 | PC:DEC:FEC | LiPF6 | 150 |
| 6a | MA6 | EC:DEC:VC | LiPF6 | 100 |
| 6b | MA6 | EC:DEC:VC | LiPF6 | 200 |
| 7a | UN1993 | EC:DEC | LiPF6 | 150 |
| 7b | UN1993 | EC:DEC | LiPF6 | 150 |

Composition of various electrolytes and maximum first cycle charge rate.

Solvents
PC = propylene carbonate
EC = ethylene carbonate
DEC = diethylene carbonate
FEC = fluoroethylene carbonate
VC = vinylene carbonate first structural layer within the battery enclosure, where the first structural layer has a first surface, and a first plurality of conductive protrusions extend from the first surface. A first plurality of electrodes is located within the battery enclosure, where the first plurality of electrodes includes a plurality of cathodes and a plurality of anodes, and wherein the first plurality of electrodes includes a second plurality of electrodes selected from the first plurality of electrodes, each of the second plurality of electrodes being in contact with the outer surface of one of said first plurality of conductive protrusions. Some embodiments relate to processes of manufacturing energy storage devices with or without the use of a backbone structure or layer. Some embodiments relate to the use of silicon anodes in combination with an electrolyte containing a selected one of LiTFSI, LiClO$_4$, LiCF$_3$SO$_3$, and LiBOB.

12 Claims, 12 Drawing Sheets

Related U.S. Application Data continuation-in-part of application No. 12/013,388, filed on Jan. 11, 2008, now Pat. No. 8,999,558.

(60) Provisional application No. 60/884,846, filed on Jan. 12, 2007, provisional application No. 60/884,828, filed on Jan. 12, 2007, provisional application No. 60/884,836, filed on Jan. 12, 2007.

(51) Int. Cl.

| | | |
|---|---|---|
| *H01M 10/0525* | (2010.01) | |
| *H01M 10/056* | (2010.01) | |
| *H01M 4/04* | (2006.01) | |
| *H01M 4/134* | (2010.01) | |
| *H01M 10/0568* | (2010.01) | |
| *B33Y 80/00* | (2015.01) | |
| *H01M 10/04* | (2006.01) | |
| *H01M 4/1395* | (2010.01) | |

(52) U.S. Cl.
CPC ..... *H01M 10/056* (2013.01); *H01M 10/0525* (2013.01); *H01M 10/0568* (2013.01); *B33Y 80/00* (2014.12); *H01M 4/049* (2013.01); *H01M 4/0423* (2013.01); *H01M 4/0426* (2013.01); *H01M 4/0428* (2013.01); *H01M 4/0438* (2013.01); *H01M 4/1395* (2013.01); *H01M 10/0472* (2013.01); *Y10T 29/49108* (2015.01)

(58) Field of Classification Search
CPC .. H01M 4/0428; H01M 4/0438; H01M 4/049; H01M 4/1395; H01M 4/0426; H01M 10/0525; H01M 10/056; H01M 10/0568; H01M 10/0472
See application file for complete search history.

(56) References Cited

U.S. PATENT DOCUMENTS

| | | |
|---|---|---|
| 4,996,129 A | 2/1991 | Tuck |
| 5,294,504 A | 3/1994 | Otagawa |
| 5,993,990 A | 11/1999 | Kanto et al. |
| 6,432,585 B1 | 8/2002 | Kawakami |
| 6,495,283 B1 | 12/2002 | Yoon et al. |
| 6,498,406 B1 | 12/2002 | Horiuchi |
| 6,821,673 B1 | 11/2004 | Hamada et al. |
| 6,833,010 B2 | 12/2004 | Asahina et al. |
| 6,878,173 B2 | 4/2005 | Miyahisa |
| 7,056,455 B2 | 6/2006 | Matyjaszewski |
| 7,153,609 B2 | 12/2006 | Kubo et al. |
| 8,691,450 B1 | 4/2014 | Spotnitz et al. |
| 2002/0034685 A1 | 3/2002 | Sato et al. |
| 2002/0039283 A1 | 4/2002 | Nakamura et al. |
| 2002/0064708 A1 | 5/2002 | Asahina et al. |
| 2002/0136957 A1 | 9/2002 | Zhang et al. |
| 2004/0064708 A1 | 4/2004 | Angelo et al. |
| 2004/0092395 A1 | 5/2004 | Hase et al. |
| 2004/0185336 A1 | 9/2004 | Ito et al. |
| 2004/0214079 A1 | 10/2004 | Simburger et al. |
| 2004/0241540 A1 | 12/2004 | Tsutsumi et al. |
| 2005/0079418 A1 | 4/2005 | Kelley et al. |
| 2006/0097691 A1* | 5/2006 | Green ............... H01M 4/134 320/107 |
| 2006/0121342 A1 | 6/2006 | Sano et al. |
| 2006/0147795 A1* | 7/2006 | Li ..................... H01M 4/13 429/209 |
| 2006/0188784 A1 | 8/2006 | Sudoh et al. |
| 2006/0269845 A1 | 11/2006 | Xu et al. |
| 2006/0281007 A1 | 12/2006 | Tsutsumi et al. |
| 2007/0059584 A1* | 3/2007 | Nakano ................. C25D 1/00 429/483 |
| 2007/0092792 A1 | 4/2007 | Kasahara et al. |
| 2007/0105017 A1* | 5/2007 | Kawase .............. H01M 4/134 429/218.1 |
| 2007/0172732 A1 | 7/2007 | Jung et al. |
| 2007/0243460 A1 | 10/2007 | Carlson et al. |
| 2008/0032170 A1 | 2/2008 | Wainright et al. |
| 2008/0081256 A1 | 4/2008 | Madou et al. |
| 2008/0081257 A1 | 4/2008 | Yoshida et al. |
| 2009/0035664 A1 | 2/2009 | Chiang et al. |
| 2009/0117472 A1 | 5/2009 | Iwamoto |
| 2009/0142656 A1 | 6/2009 | Nathan et al. |
| 2010/0003603 A1 | 4/2010 | Chiang et al. |
| 2010/0119936 A1 | 5/2010 | Misumi et al. |
| 2010/0119939 A1 | 5/2010 | Misumi et al. |
| 2011/0111283 A1 | 5/2011 | Rust, III et al. |
| 2011/0171518 A1 | 7/2011 | Dunn et al. |

FOREIGN PATENT DOCUMENTS

| | | |
|---|---|---|
| JP | 11233076 | 8/1999 |
| JP | 2008153033 | 7/2008 |
| JP | 2008153034 | 7/2008 |
| JP | 2008153035 | 7/2008 |
| JP | 2008153036 | 7/2008 |
| WO | 2005119812 | 12/2005 |
| WO | 2008072638 | 6/2008 |

OTHER PUBLICATIONS

Chamran et al., Three-dimensional nickel-zinc microbatteries, 2006, MEMS, Jan. 22-26, 2006, 950-953.
Patent Cooperation Treaty, International Search Report for PCT/US2008/050942, dated May 18, 2008.
Chan et al., High-performance lithium battery anodes using silicon nanowires, Nature Nanotechnology, 3, 31-35.
Serpo, A tenfold improvement in battery life?, ZDNet News, Jan. 15, 2008, 2 pages.
Long et al., Three-Dimensional battery Architectures, Chemical Reviews, 2004, 104, 4463-4492.
Liu, C., Foundations of MEMS, Chapter 10, 1-55.
Kanamura et al., Electrophoretic fabrication of LiCoO2 positive electrodes for rechargeable lithium batteries, Journal of Power Sources, 2001, 97-98, 294-297.
Caballero et al., LiNi.5Mn1.5O4 thick-film electrodes prepared by electrophoretic deposition for use in high voltage lithium-ion batteries, Journal of Power Sources, 156, 2006, 583.
Wang et al., Li+-intercalation electrochemical/chromic props of vanadium pentoxide films by sol electrophoretic deposition, Electrochimica Acta, 51, 2006, 4865-4872.
Nichizawa et al., Template synth of polypyrrole-coated spinel LiMn2O4 nantubules and props as cathode active materials for Li batteries, J. Electrochemical Society, 1997, 1923-1927.

(56) References Cited

OTHER PUBLICATIONS

Shembel et al., Thin Layer Electrolytic Monbdenum Oxysulfides for Li Secondary batteries with liquid and polymer electrolytes, 5th Adv Batteries and Accumulators, 2004.
Kobrin et al., Molecular Vapor Deposition—An imporved Vapor-Phase deposition technique of molecular coatings for MEMS Devices, SEMI Tech Symp: (STS,ISM), 2004.
Green et al., Structured Silicon Anodes for Li battery applications, Electrochem & Solid State Letters, 6, 2003, A75-A79.
Shin et al., Porous silicon negative electrodes for rechargeable lithium batteries, Journal of Power Sources, 193, 2005, 314-320.
Broussely et al., Li-ion batteries and portable power source prospects for the next 5-10 years, Journal of Power Sources, 136, 2004, 386-394.
Lehmann, The physics of macropore formation in low doped n-type silicon, Journal of Electrochemical Society, 149(10), 1993, 2836-2843.
Vyatkin et al., Random and ordered macropore formation in p-type silicon, Journal of Electrochemical Society, 149(1) G70-G76.
Van Den Meerakker et al., Etching of deep macropores in 6 in. Si wafers, Journal of Electrochemical Society, 147(7), 2000, 2757-2761.
Balakrishnan et al., Safety mechanisms in lithium-ion batteries, Journal of Power Sources, 155, 2006, 401-414.
Arora et al., Battery separators, Chemical Reviews, 104, 2004, 4419-4462.
Masuda, H. et al., Ordered Metal Nanohole Arrays Made by a Two-Step Replication of Honeycomb Structures of Anodic Alumina, Science, 1995, 268(5216), 1466-1468.

\* cited by examiner

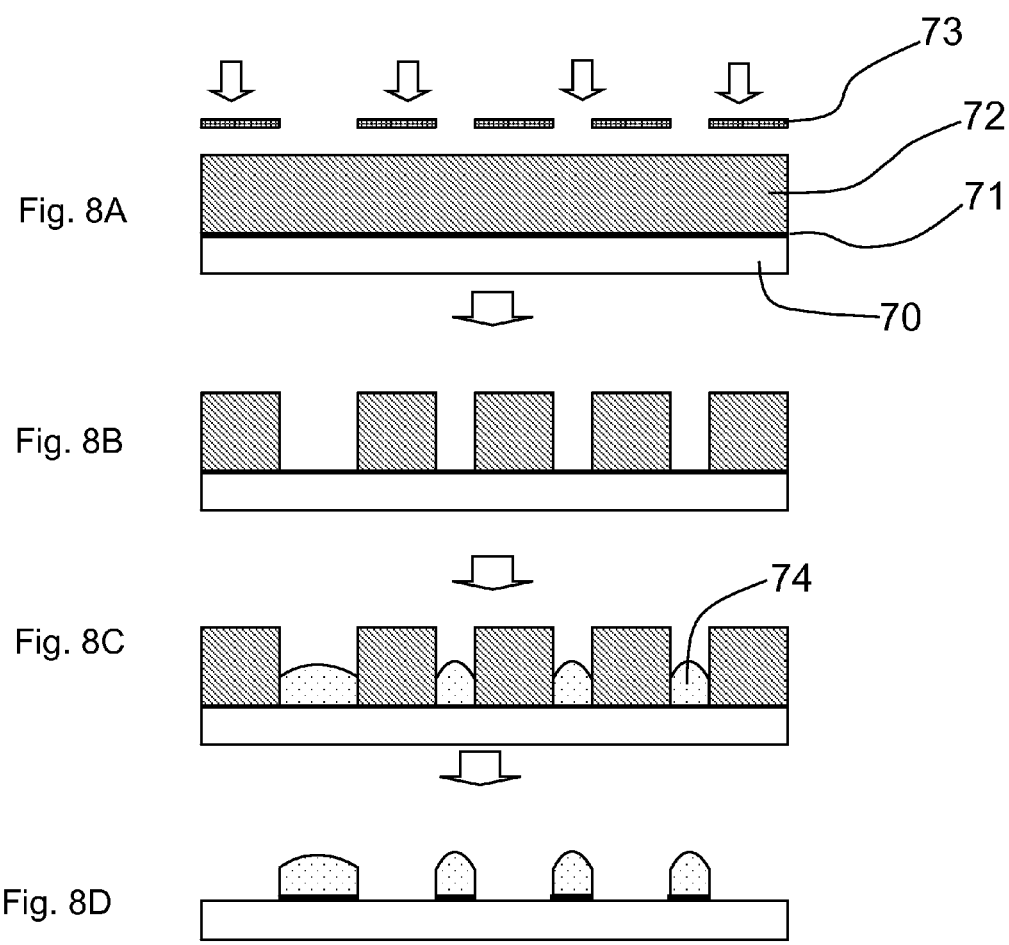

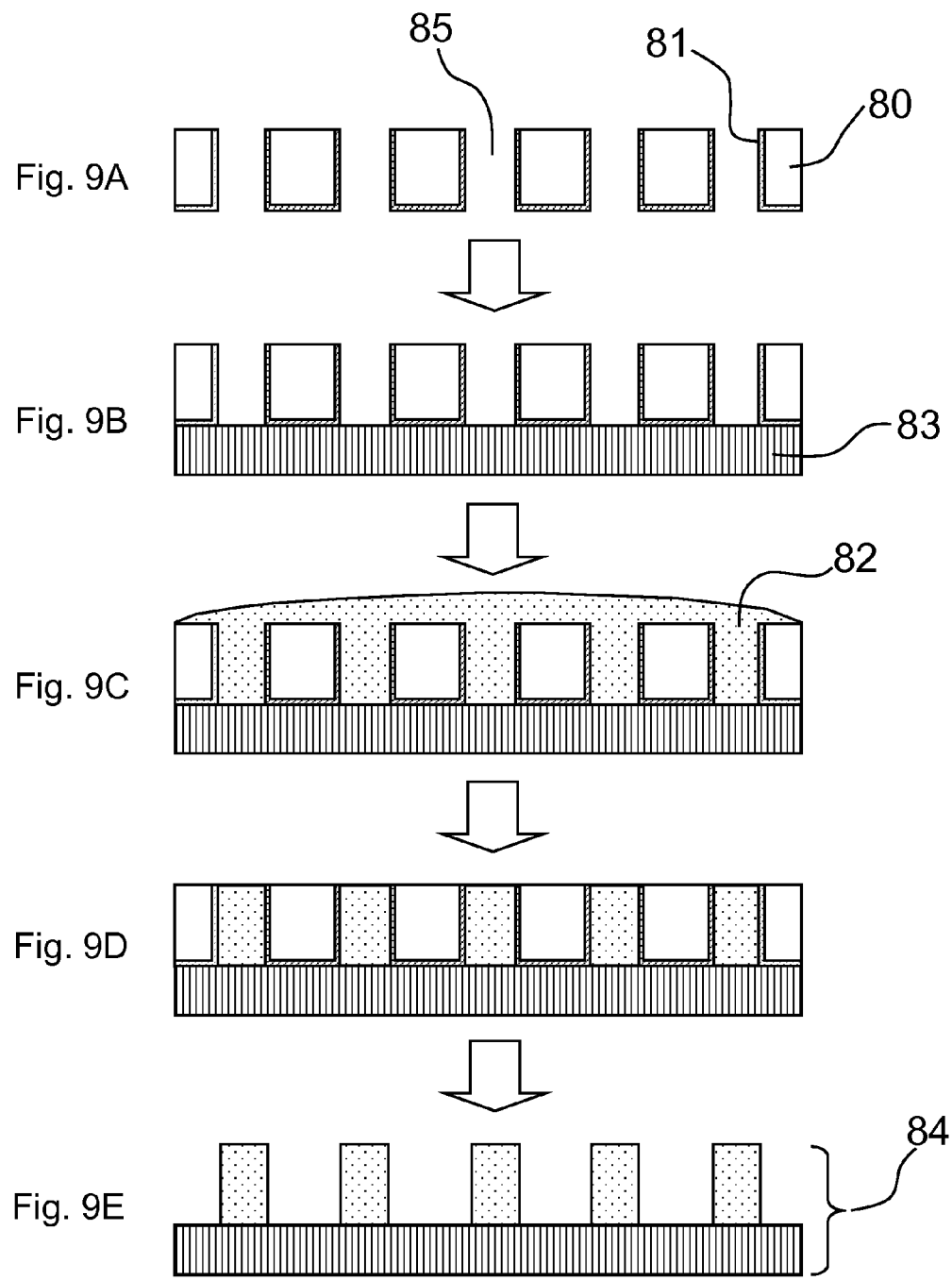

| Exp # | Code | Solvents | Salt | Max 1st Cycle Current microamperes |
|---|---|---|---|---|
| 1a,b | MA1 | PC | LiPF6 | 200 |
| 2a,b | MA2 | PC | TFSI | 500 |
| 3a | MA3 | EC:DEC | TFSI | 500 |
| 3b | MA3 | EC:DEC | TFSI | 300 |
| 3c | MA3 | EC:DEC | TFSI | 500 |
| 3d | MA3 | EC:DEC | TFSI | 500 |
| 4a | MA4 | EC:DEC:FEC | LiPF6 | 250 |
| 4b | MA4 | EC:DEC:FEC | LiPF6 | 250 |
| 5a | MA5 | PC:DEC:FEC | LiPF6 | 150 |
| 5b | MA5 | PC:DEC:FEC | LiPF6 | 150 |
| 6a | MA6 | EC:DEC:VC | LiPF6 | 100 |
| 6b | MA6 | EC:DEC:VC | LiPF6 | 200 |
| 7a | UN1993 | EC:DEC | LiPF6 | 150 |
| 7b | UN1993 | EC:DEC | LiPF6 | 150 |

Figure 11 Composition of various electrolytes and maximum first cycle charge rate.

Solvents
PC = propylene carbonate
EC = ethylene carbonate
DEC = diethylene carbonate
FEC = fluoroethylene carbonate
VC = vinylene carbonate

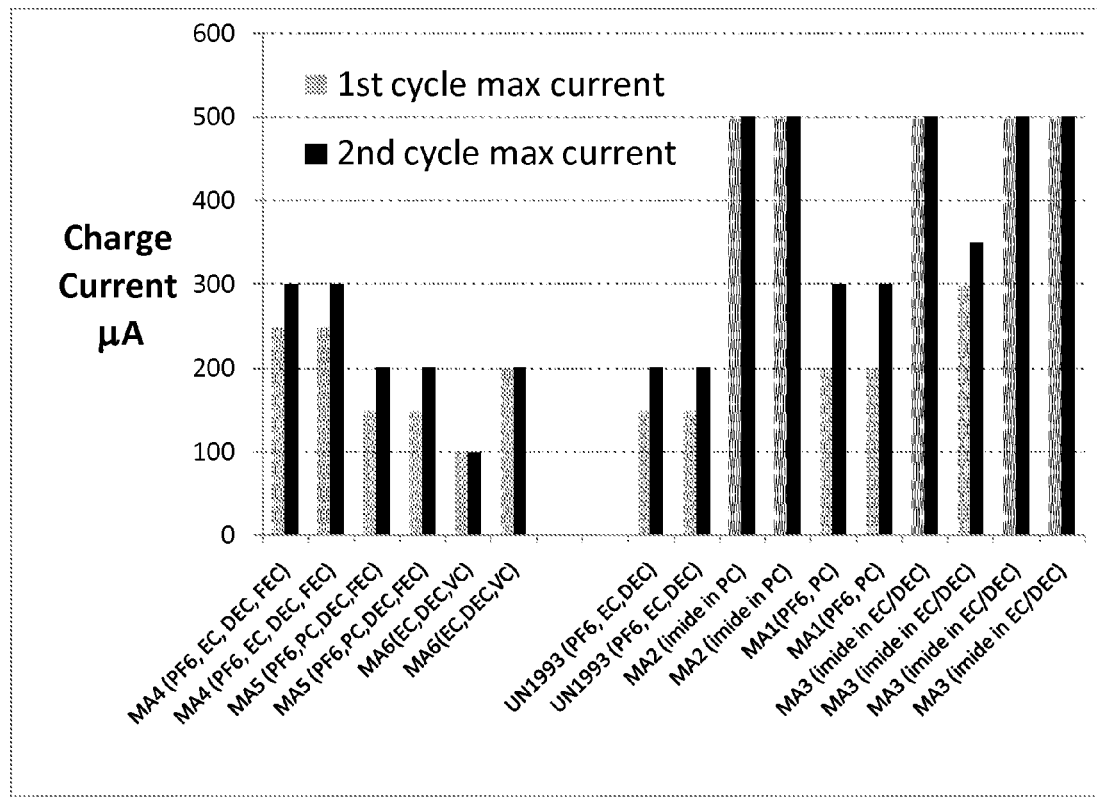
Figure 12 Comparison of maximum charge currents for 1 cm² silicon sheet in various electrolytes.

THREE DIMENSIONAL BATTERIES AND METHODS OF MANUFACTURING THE SAME

CROSS-REFERENCE TO RELATED APPLICATIONS

This application claims priority under 35 U.S.C. § 120 to U.S. application Ser. No. 12/013,388, entitled "Three-Dimensional Batteries and Methods of Manufacturing the Same," filed on Jan. 11, 2008; which is hereby incorporated by reference herein in its entirety. U.S. Provisional Application No. 60/884,836, entitled "Electrodes For Three Dimensional Lithium Batteries And Methods Of Manufacturing Thereof," filed on Jan. 12, 2007; U.S. Provisional Application No. 60/884,828, entitled "Three-Dimensional Batteries and Methods of Manufacturing Using Backbone Structure," filed on Jan. 12, 2007; and U.S. Provisional Application No. 60/884,846, entitled "Three-Dimensional Lithium Battery Separator Architectures," filed on Jan. 12, 2007; all of which are hereby incorporated by reference herein in their entirety.

BACKGROUND OF THE INVENTION

1. Technical Field of the Invention

Implementations consistent with the principles of the invention generally relate to the field of battery technology, more specifically to three-dimensional energy storage systems and devices, such as batteries and capacitors, and methods of manufacturing thereof.

2. Background

Existing energy storage devices, such as batteries, fuel cells, and electrochemical capacitors, typically have two-dimensional laminar architectures (e.g., planar or spiral-wound laminates) with a surface area of each laminate being roughly equal to its geometrical footprint (ignoring porosity and surface roughness).

FIG. 1 shows a cross sectional view of an existing energy storage device, such as a lithium-ion battery. The battery 15 includes a cathode current collector 10, on top of which a cathode 11 is assembled. This layer is covered by a separator 12, over which an assembly of an anode current collector 13 and an anode 14 are placed. FIG. 2 shows another embodiment of a lithium-ion battery where the cathode current collector 10 is coated on both sides with a cathode active paste 11, and the anode current collector 13 is coated on both sides with an anode active paste 14 and separator layers 12 are placed on both sides of the anode active pastes. This stack can be rolled, stuffed into a can, and filled with electrolyte to assemble a battery. During a charging process, lithium leaves the cathode 11 and travels through the separator 12 as a lithium ion into the anode 14. Depending on the anode 14 used, the lithium ion either intercalates (e.g., sits in a matrix of an anode material without forming an alloy) or forms an alloy. During a discharge process, the lithium leaves the anode 14, travels through the separator 12 and passes through to the cathode 11.

Three-dimensional batteries have been proposed in the literature as ways to improve battery capacity and active material utilization. It has been proposed that a three-dimensional architecture may be used to provide higher surface area and higher energy as compared to a two-dimensional, laminar battery architecture. There is a benefit to making a three-dimensional energy storage device due to the increased amount of energy that may be obtained out of a small geometric area.

The following references may further help to illustrate the state of the art, and are therefore incorporated by reference as non-essential subject matter herein: Long et. al., "Three-Dimensional Battery Architectures," *Chemical Reviews*, (2004), 104, 4463-4492; Chang Liu, FOUNDATIONS OF MEMS, Chapter 10, pages 1-55 (2006); Kanamura et. al., "Electrophoretic Fabrication of $LiCoO_2$ Positive Electrodes for Rechargeable Lithium Batteries," *Journal of Power Sources*, 97-98 (2001) 294-297; Caballero et al., "$LiNi_{0.5}Mn_{1.5}O_4$ thick-film electrodes prepared by electrophoretic deposition for use in high voltage lithium-ion batteries," *Journal of Power Sources*, 156 (2006) 583-590; Wang and Cao, "$Li^+$-intercalation Electrochemical/Electrochromic Properties Of Vanadium Pentoxide Films By Sol Electrophoretic Deposition," *Electrochimica Acta*, 51, (2006), 4865-4872; Nishizawa et al., "Template Synthesis of Polypyrrole-Coated Spinel $LiMn_2O_4$ Nanotubules and Their Properties as Cathode Active Materials for Lithium Batteries," *Journal of the Electrochemical Society*, 1923-1927, (1997); Shembel et. al., "Thin Layer Electrolytic Molybdenum Oxysulfides For Lithium Secondary Batteries With Liquid And Polymer Electrolytes,"$5^{th}$ *Advanced Batteries and Accumulators*, ABA-2004, Lithium Polymer Electrolytes; and Kobrin et. al., "Molecular Vapor Deposition—An Improved Vapor-Phase Deposition Technique of Molecular Coatings for MEMS Devices," *SEMI Technical Symposium Innovations in Semiconductor Manufacturing (STS: ISM)*, *SEMICON West* 2004, 2004 *Semiconductor Equipment and Materials International*.

Three-dimensional batteries can employ monolithic electrodes. For example, FIG. 3 shows some designs of three dimensional batteries. In FIGS. 3A-3D, cathodes 30 and anodes 31 protrude from the same backplane and are alternating in a periodic fashion. The electrodes can be monolithic. If silicon is used as the anode, then a monolithic structure can be readily assembled using well-known techniques such as deep reactive ion etching. However, use of such silicon anodes may be problematic with conventional battery electrolytes such as lithium hexafluorophosphate (LiPF6) in a mixture of ethylene carbonate and diethyl carbonate. Specifically, the silicon anode may show a high impedance during the first charge which would lead to a need to limit the charging rate to a low level in order to avoid lithium metal deposition. This low charging rate would greatly increase the time required to charge the battery and hence the manufacturing cost.

It would be desirable to make three-dimensional electrochemical energy devices with silicon anodes that provide significantly higher energy and power density, while addressing the above issues or other limitations in the art.

SUMMARY OF THE INVENTION

Various methods and apparatus relating to three-dimensional battery structures and methods of manufacturing them are disclosed and claimed. In certain embodiments, a battery comprises a plurality of non-laminar, three-dimensional electrodes including a plurality of cathodes and a plurality of monolithic silicon anodes and an electrolyte solution in fluid contact with the plurality of electrodes, the electrolyte solution comprising a selected one of lithium (bis)trifluoromethanesulfonimide (LiTFSI), $LiClO_4$, $LiCF_3SO_3$, and LiBOB.

In certain embodiments, a three-dimensional battery comprises a plurality of electrodes including a plurality of cathodes and a plurality of silicon anodes, wherein either the plurality of cathodes or the plurality of silicon anodes are non-laminar, three-dimensional electrodes; and an electrolyte solution in fluid contact with the plurality of electrodes, wherein the electrolyte solution comprises a salt selected from LiTFSI, LiClO$_4$, LiCF$_3$SO$_3$, and LiBOB.

In certain embodiments, a three-dimensional battery comprises a battery enclosure, and a first structural layer within the battery enclosure, where the first structural layer has a first surface, and a first plurality of conductive protrusions extend from the first surface. A first plurality of electrodes is located within the battery enclosure, where the first plurality of electrodes includes a plurality of cathodes and a plurality of anodes, and wherein the first plurality of electrodes includes a second plurality of electrodes selected from the first plurality of electrodes, each of the second plurality of electrodes being in contact with the outer surface of one of said first plurality of conductive protrusions. The plurality of anodes comprises silicon and an electrolyte solution comprising a selected one of LiTFSI, LiClO$_4$, LiCF$_3$SO$_3$, and LiBOB is in fluid contact with the first plurality of electrodes.

Other aspects and advantages of the present invention may be seen upon review of the figures, the detailed description, and the claims that follow.

BRIEF DESCRIPTION OF THE DRAWINGS

Some embodiments of the invention are described with reference to the following figures.

FIGS. 8A-8D depict a schematic representation of a process for manufacturing a backbone structure using an additive electrochemical deposition, electroless deposition, or electrophoretic deposition process, according to an embodiment of the invention.

FIGS. 9A-9E depict a schematic representation of a process for manufacturing a backbone structure using an additive extrusion process, according to an embodiment of the invention.

FIG. 11 depicts experimental results for maximum first cycle charge rates for certain compositions of various electrolytes, according to certain embodiments of the invention.

FIG. 12 depicts experimental results for maximum charge currents for a 1 cm$^2$ silicon sheet in various electrolytes, according to certain embodiments of the invention.

DETAILED DESCRIPTION

Figure 1:
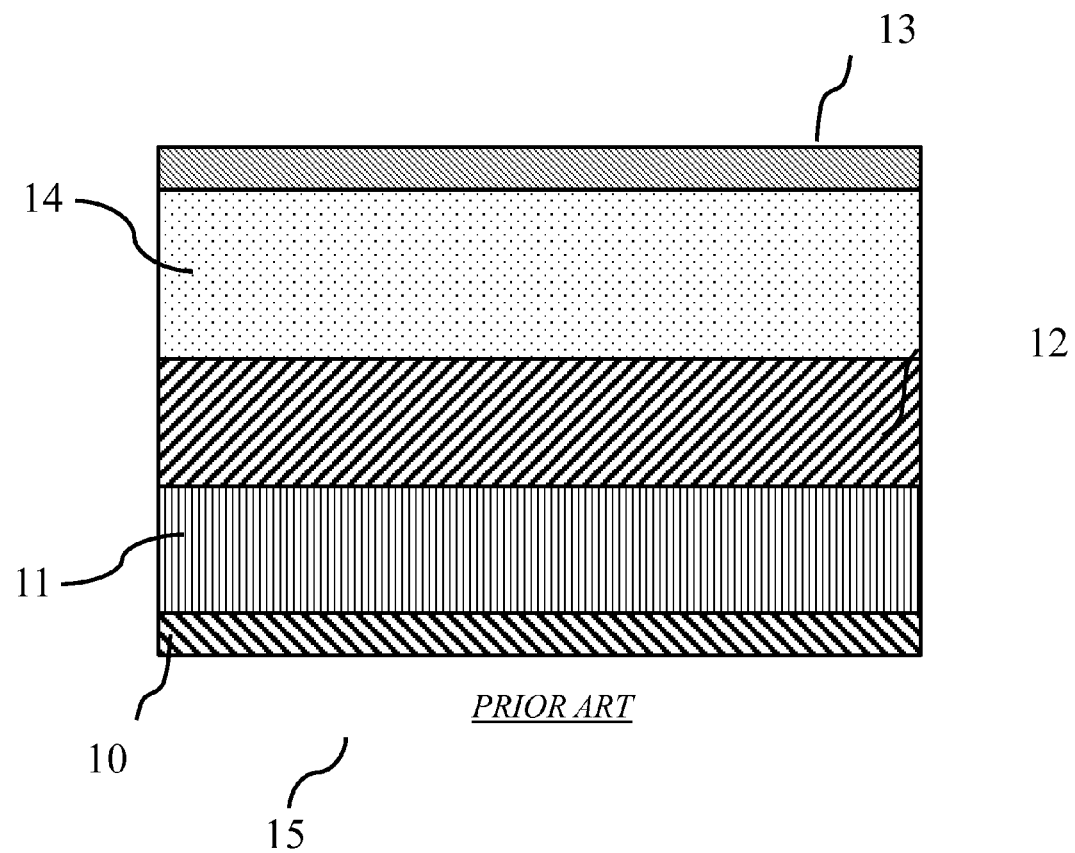
FIG. 1 is a generic cross-section of an existing two-dimensional energy storage device such as a lithium ion battery.
Figure 2:
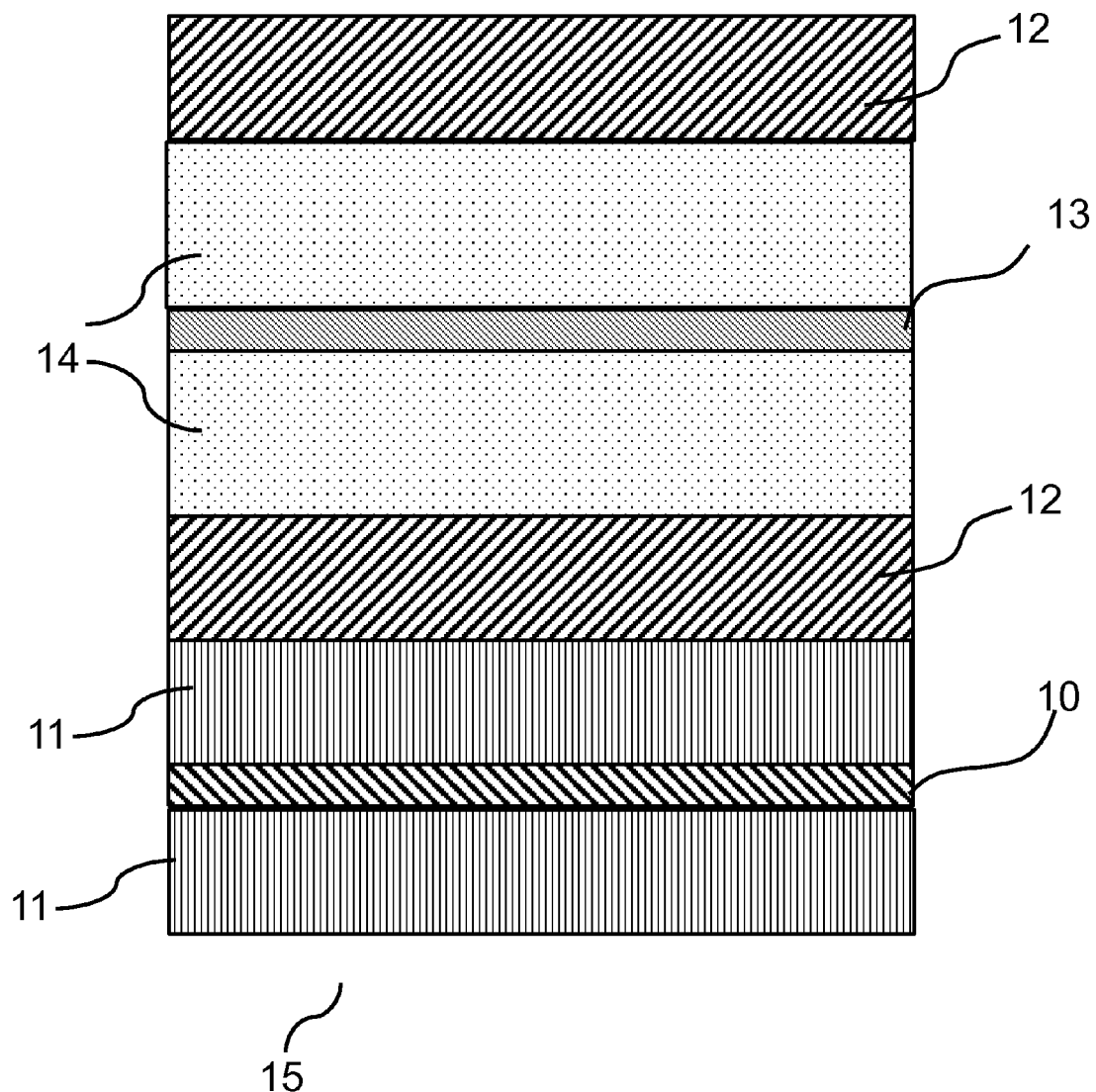
FIG. 2 is a generic cross-section of an existing two-dimensional energy storage device such as a lithium ion battery.

Certain embodiments of the invention relate to the design of a three-dimensional lithium-ion battery with a silicon anode. Existing energy storage devices, such as batteries, fuel cells, and electrochemical capacitors, typically have two-dimensional laminar architectures (e.g., planar or spiral-wound laminates) with a surface area of each laminate being roughly equal to its geometrical footprint (ignoring porosity and surface roughness). A three-dimensional energy storage device can be one in which an anode, a cathode, and/or a separator are non-laminar in nature. For example, if electrodes protrude sufficiently from a backplane to form a non-laminar active battery component, then the surface area for such a non-laminar component may be greater than twice the geometrical footprint of its backplane. In certain embodiments, the ratio of the surface area of a three-dimensional electrode to its geometric footprint may be between about 2 and about 1000.

Some embodiments of the invention relate to the use of a backbone structure for the manufacture of three-dimensional energy storage devices, such as batteries, capacitors, and fuel cells. The backbone structure may be used for the purpose of providing mechanical stability, electrical connectivity, and increased surface area per unit geometrical area. By way of example, the backbone structure may be made in the shape of pillars by wire-bonding aluminum on a flat substrate, which may be subsequently coated with a cathode or anode material for the purpose of assembling a battery. Examples of backbone formation using various materials, shapes, and methodologies are presented herein, among other embodiments.

Three-dimensional energy storage devices may produce higher energy storage and retrieval per unit geometrical area than conventional devices. Three-dimensional energy storage devices may also provide a higher rate of energy retrieval than two-dimensional energy storage devices for a specific amount of energy stored, such as by minimizing or reducing transport distances for electron and ion transfer between an anode and a cathode. These devices may be more suitable for miniaturization and for applications where a geometrical area available for a device is limited and/or where energy density requirement is higher than what may be achieved with a laminar device.

Some embodiments of the invention include a mechanically stable, electrically conductive backbone structure that ends up being a part of the final assembled energy storage device. A backbone material typically does not take an active part in electrochemical reactions of the energy storage device, and may enhance mechanical and electrical robustness.

The backbone material may also act as a high surface area substrate for manufacturing the high surface area electrochemical device. Mechanical robustness may increase the lifetime of the device, since active materials that constitute the device are typically porous electrodes with relatively lower mechanical stability. Electrical conductivity may enhance or maintain a power density of the device (e.g., by decreasing resistivity) while also equalizing current distribution between electroactive species.

A backbone structure may be made in any shape that provides higher surface area relative to geometrical area, such as pillars, posts, plates, waves, circles, diamonds, spirals, staircase structures, and so forth. The backbone structure may be made out of any material that may be shaped, such as metals, semiconductors, organics, ceramics, and glasses. The backbone structure may serve to provide: (i) rigidity to active electrodes in an energy storage device, such as anodes and cathodes in a lithium ion battery; (ii) electrical connectivity to tall three-dimensional structures; and (iii) increased surface area per unit geometrical area. Desirable materials include semiconductor materials such as silicon and germanium. Carbon-based organic materials may also be used to form backbone structures for three-dimensional shaping. Metals, such as aluminum, copper, nickel, cobalt, titanium, and tungsten, may also be used for backbone structures.

In some embodiments, a backbone structure is made out of a metal, semiconductor, organic material, ceramic, or glass using a subtractive formation technique. These materials may be processed by reactively etching a substrate using a selective etch mask and a plasma etch process. Alternatively, or in conjunction, electrochemical etching, stamping, or electrical discharge machining may be used to selectively remove material preferentially in areas where these materials are not desired.

In other embodiments, a backbone structure is made out of a metal, semiconductor, organic, ceramic, or glass using an additive formation technique. These materials may be processed by making a sacrificial mold using a technique such as conventional lithography, and depositing a backbone material using techniques such as electrochemical deposition, electroless deposition, electrophoretic deposition, vacuum assisted filling, stencil assisted filling, and so forth. In certain cases, the backbone structure may be assembled directly using a wirebonding process. In other cases, the backbone structure may be made on a flat plate using conventional lithography and deposition techniques, and subsequently assembled by "pick and place" and soldering or gluing techniques.

In other embodiments, a backbone material may be shaped using printing techniques, such as three-dimensional printing and inkjet printing, to form a backbone structure using single or multiple layers of printing to obtain a desired shape and thickness. Alternatively, or in conjunction, the backbone material may be assembled in the form of layered sheets, with sacrificial layers deposited in between. After stacking of the sheets is substantially complete, a resulting structure is cut into pieces of a desired height, assembled together, and the sacrificial material is released to provide the backbone structure.

In the case of an electrically conductive backbone structure, an active material may be directly assembled on top of and around the backbone structure by various techniques, such as electrochemical deposition, electroless deposition, co-deposition in an organic or inorganic matrix, electrophoretic deposition, mechanical filling and compacting, and vacuum assisted flow deposition.

In case of an electrically non-conductive backbone structure, a conducting layer may be deposited by various techniques, such as electrochemical or electroless deposition, vapor assisted vacuum deposition such as Atomic Layer Deposition (ALD) and Chemical Vapor Deposition (CVD), sputter deposition, evaporation, and electrophoretic deposition. This conductive layer may be subsequently removed in order to remove an electrical connection between an anode and a cathode. This removal may be accomplished using techniques such as sputter etching, ion milling, and liftoff. In addition, techniques such as chemical dissolution may be used with standard techniques such as lithography to protect areas that do not need to be removed.

Figure 4:
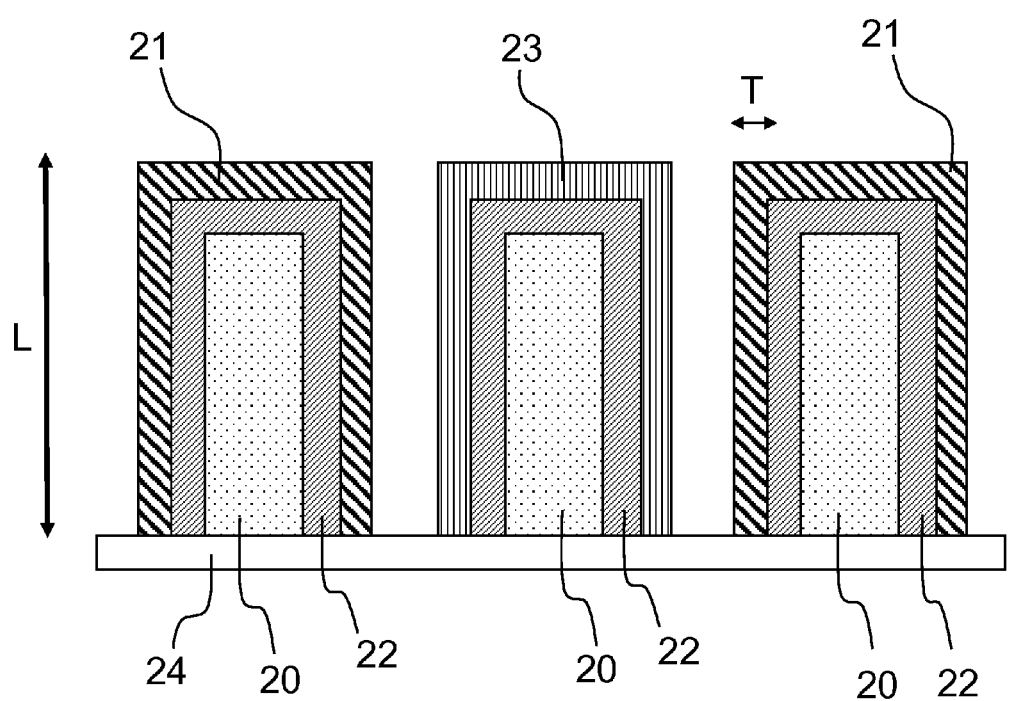
FIG. 4 is a schematic illustration of a backbone structure according to an embodiment of the invention.
Figure 5A:
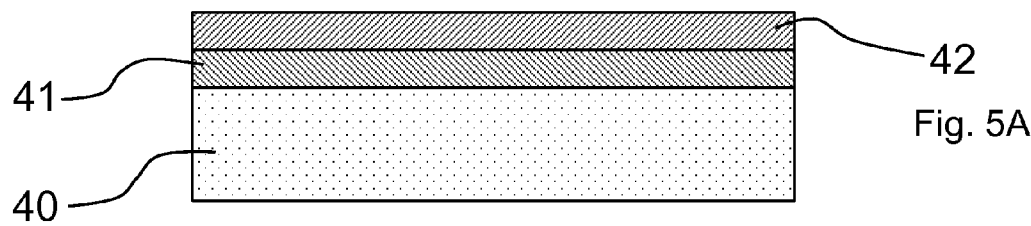
FIGS. 5A-5E depict a schematic representation of a process for manufacturing a backbone structure using a subtractive reactive ion etch process, according to an embodiment of the invention.
Figure 5B:
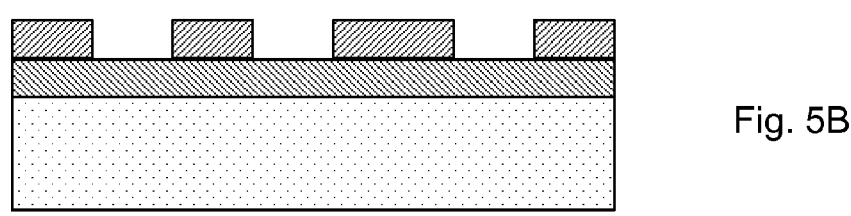
Figure 5C:
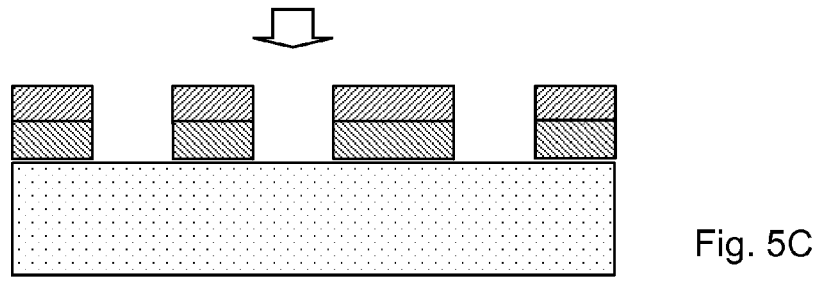
Figure 5D:
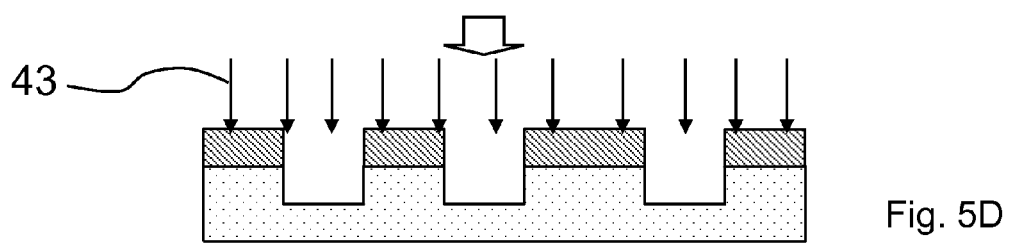
Figure 5E:
Figure 6A:
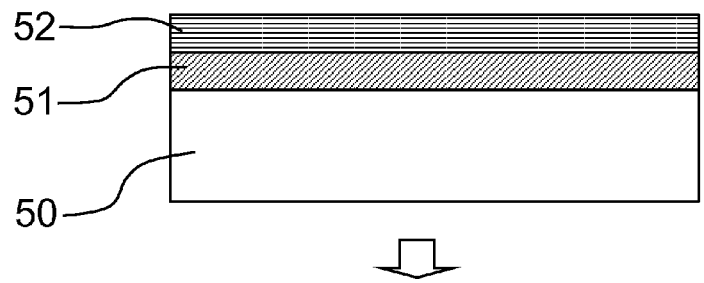
FIGS. 6A-6D depict a schematic representation of a process for manufacturing a backbone structure using a subtractive electrochemical etch process, according to an embodiment of the invention.
Figure 6B:
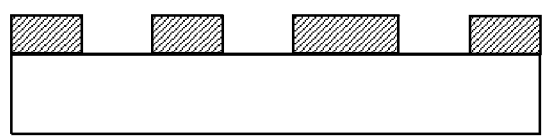
Figure 6C:
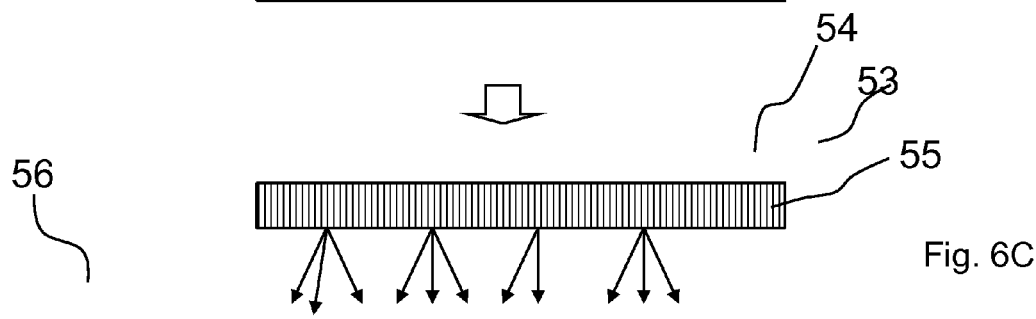
Figure 6D:
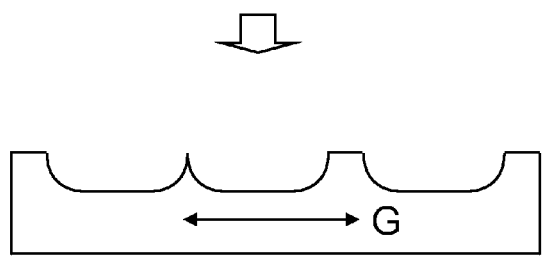

FIG. 4 illustrates an exemplary concept of a backbone structure 20 used in the formation of a three-dimensional battery. FIG. 4 shows a cross-sectional schematic of two positive electrodes 21 and a negative electrode 23. In this embodiment, the backbone structure 20 includes a non-conductive base 24 of a common material on which a conductive material 22 has been deposited and removed in the areas where it is not needed in order to separate the electrodes 21 and 23. It is apparent from comparing FIG. 4 and FIG. 1 that a surface area for the electrodes 21 and 23 in FIG. 4 is relatively higher as compared to the surface area for the electrodes shown in FIG. 1, calculating this area as a product of a length L and a thickness T of the electrodes 21 and 23. It should be noted that the thickness, and therefore related properties such as conductivity, of various features (such as electrodes and backbone structure protrusions) according to certain embodiments may be varied locally (e.g., from electrode to electrode or from protrusion to protrusion) based on current-carrying requirements or other relevant performance specifications.

Figure 3A:
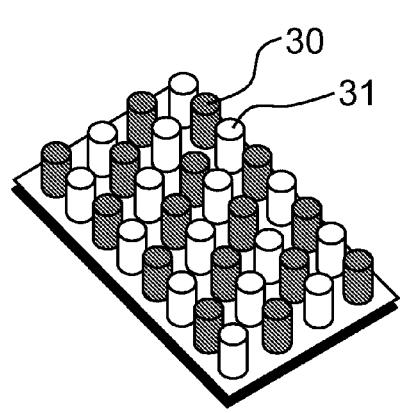
FIGS. 3A-3D are schematic illustrations of some shapes into which backbone structures may be assembled according to certain embodiments of the invention.
Figure 3B:
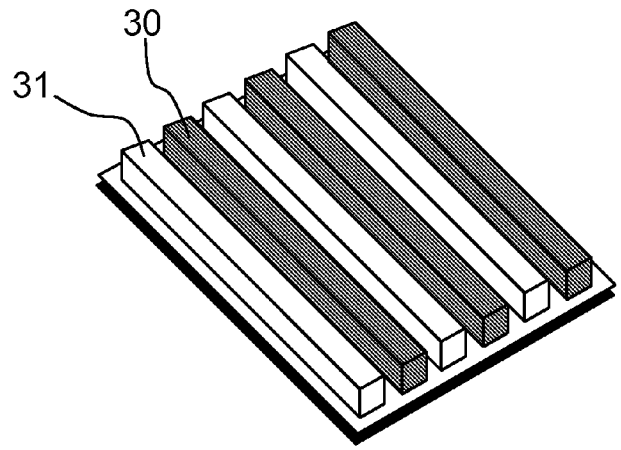
Figure 3C:
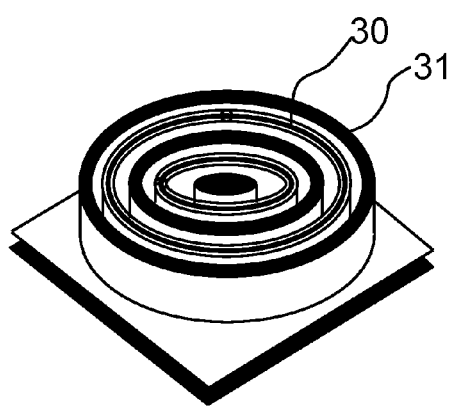
Figure 3D:
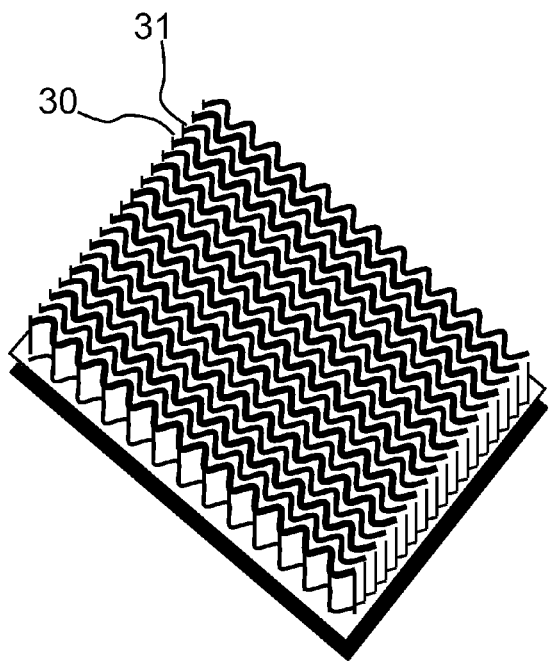

Some examples of three-dimensional architectures that are capable of use with certain embodiments of the present invention, and that have cathodes and anodes protruding from the same backplane, are shown in FIGS. 3A-3D. FIG. 3A shows a three-dimensional assembly with cathodes and anodes in the shape of pillars, FIG. 3B shows a three-dimensional assembly with cathodes and anodes in the shape of plates, FIG. 3C shows a three-dimensional assembly with cathodes and anodes in the shape of concentric circles, and FIG. 3D shows a three-dimensional assembly with cathodes and anodes in the shape of waves. Other configurations, such as honeycomb structures and spirals might also be used with certain embodiments of the present invention. In FIGS. 3A-3D, cathodes 30 and anodes 31 protrude from the same backplane and are alternating in a periodic fashion. However, in other embodiments the cathodes 30 may protrude from a different backplane than anodes 31. In certain embodiments, the backplane supporting the cathodes may be located proximate the backplane supporting the anodes such that the anodes protrude among corresponding ones of the cathodes.

FIGS. 5A-5E depict a schematic representation of an overall process flow for manufacturing a backbone structure using a subtractive reactive ion etch process according to certain embodiments. The process involves using a substrate 40 that may be shaped using a directional plasma source to form a volatile gaseous by-product, thereby facilitating its removal. A non-limiting example of the substrate 40 is one formed of silicon, which may be single-crystal or polycrystalline in nature. A masking layer 41 is deposited on top of the substrate 40 by methods such as vacuum deposition, thermal oxidation, surface coating, and wet chemical deposition. In the case of silicon as the substrate 40, a thermally grown silicon dioxide layer of a particular thickness may serve as the masking layer 41. This layer 41 may be subsequently patterned by standard patterning techniques such as lithography in order to provide a pattern suitable for further processing to create the backbone structure. In some embodiments of the invention, the masking layer 41 may be covered with a second masking layer 42 that is used to pattern the first masking layer 41 (see FIGS. 5A-5B). In this case, the first masking layer 41 is patterned by using the second masking layer 42 as a stencil (see FIG. 5C). For the silicon/silicon dioxide case, a standard photoresist may be used as the second masking layer 42. The second masking layer 42 may be patterned with standard optical lithography techniques. The second masking layer 42 may be selectively removed using selective wet or dry methods, leaving behind the patterned first masking layer 41 (see FIG. 5D). This combination of the substrate 40 and the patterned first masking layer 41 is subjected to a directional plasma 43 in a controlled environment in order to transfer the image of the first masking layer 41 onto the substrate 40 (see FIG. 5D). This reactive etch process in the presence of a directional plasma source may provide excellent anisotropic etching of the substrate 40 while etching the masking layer 41 itself at a very low rate. After the reactive etch of the substrate 40 is substantially complete, the masking layer 41 may be removed to leave the patterned substrate 40 behind, thereby forming the backbone structure (see FIG. 5E).

The following example further explains concepts described with reference to FIGS. 5A-5E. Single-crystal or polycrystalline silicon may be used as the substrate 40 that may be etched directionally in the presence of a plasma. The first masking layer 41 may be a thermally grown silicon dioxide layer of a particular thickness. A standard photoresist, such as AZ4620™ and AZP4620™ (commercially available from Clariant Corporation), may be used as the second masking layer 42. This layer 42 may be spin coated on top of the silicon dioxide layer, and subsequently patterned with standard optical lithography techniques. The areas of the photoresist that are exposed to light may be developed away using a developer solution, such as AZ400K™ (commercially available from Clariant Corporation). This patterned structure is dipped in a solution of HF, NH$_3$F, and water (Buffered Oxide Etch), wherein exposed silicon dioxide surfaces are dissolved. The remaining photoresist may be selectively removed by using a compatible organic solvent, such as N-methyl-2-Pyrrolidone, leaving behind the patterned silicon dioxide layer. This combination of the silicon and patterned silicon dioxide may be subjected to a directional fluoride plasma source in order to etch an image of the silicon dioxide layer onto the substrate 40. The directionality of the plasma 43 is controlled by a bias voltage between an anode and a cathode in a conventional plasma reactive ion etcher. A difference in rate between etch of silicon and silicon dioxide causes a pattern to be transferred to the substrate 40 without much etching in a lateral direction. After the reactive etch of silicon is substantially complete, the masking layer 41 may be removed by immersion in the Buffered Oxide Etch solution to leave the patterned substrate 40 behind. In some cases, a stop layer can be added to the bottom of the substrate 40 to facilitate complete etching and isolation of the cathode and anode backbone structures. This process may be used to form a plurality of silicon protrusions that may be used as anodes in a battery according to certain embodiments of the present invention.

In some embodiments, the patterned substrate 40 is electrically conductive, in which case the resulting backbone structure is ready for further processing of active materials. In certain other embodiments, the backbone structure is electrically non-conductive. In this case, further processing by deposition of a conductive layer may be performed by various methods.

FIGS. 6A-6D depict a schematic representation of a process for manufacturing a backbone structure using a subtractive electrochemical etch process according to certain embodiments. In these particular embodiments, a substrate 50 is patterned using a electrically insulating masking layer 51 that is deposited on top of the substrate 50 by methods such as vacuum deposition, thermal oxidation, surface coating, and wet chemical deposition. This layer 51 is subsequently patterned by standard patterning techniques such as lithography in order to provide a pattern suitable for further processing to create the backbone structure. In some embodiments of the invention, the masking layer 51 is covered with a second masking layer 52 that is used to pattern the first masking layer 51 (see FIGS. 6A-6B). In this case, the first masking layer 51 is patterned by using the second masking layer 52 as a stencil. The second masking layer 52 is selectively removed using selective wet or dry methods, leaving behind the patterned first masking layer 51 (see FIG. 6B). The combination of the substrate 50 and the first masking layer 51 is placed in an electrochemical cell 53 that has a counter electrode 54 and a nozzle 55 that delivers a solution used to electrochemically remove a material in areas that are exposed to the solution (see FIG. 6C). In certain embodiments, the whole workpiece may be dipped into the solution that may dissolve the material that is in contact with the solution. However, the illustrated process may be more isotropic in nature, and typically an amount of material removed in the depth direction $\underline{D}$ may be substantially the same as the amount of material removed in each side of the width direction $\underline{W}$. A dip-tank solution may be used for making features in which gaps $\underline{G}$ in the resulting backbone structure are significantly narrower than the width $\underline{W}$. A DC power source 56 may be used to apply a potential that is sufficient to remove the material in contact with the solution. The process is substantially complete when essentially the desired amount of material is removed, which may be controlled based on the rate of etching that has been previously determined. In certain other cases, a current may be monitored, and a drop in the current may correspond to an end-point of the electrochemical reaction. After the reaction is substantially complete, the workpiece is removed, and the masking layer 51 may be removed to leave the patterned substrate 50 behind, thereby forming the backbone structure.

The following example further explains concepts described with reference to FIGS. 6A-6D. One example of the substrate 50 for electrochemical patterning is a copper sheet. A sheet of the desired thickness may be used as the substrate 50, and may be patterned using the electrically insulating masking layer 51 (e.g., AZ4620™ or AZP4620™ photoresist) that is deposited on top of the substrate 50 by spin coating. This layer 51 may be exposed to light in the presence of a photomask that blocks light to areas in which the resist should be left behind. The workpiece may be placed in a solution that selectively removes the exposed areas. The combination of the substrate 50 and the first masking layer 51 is placed in the electrochemical cell 53 that has the counter electrode 54 (e.g., platinum) and the nozzle 55 that delivers the electrochemical etch solution used to electrochemically remove the metal in areas that are exposed to the solution. A combination of 10 wt % sulfuric acid and 1 wt % hydrogen peroxide may be delivered through the nozzle 55 to the workpiece. The DC power source 56 may be used to apply an anodic potential to the substrate 50, which removes copper in areas where the solution comes in contact with the copper anode and the platinum cathode at the same time, thereby forming a local electrochemical cell. After the reaction is substantially complete, the workpiece may be removed, and the masking layer 51 may be removed with N-methyhl-2-pyrrolidone to leave the patterned substrate 50 behind.

Figure 7A:
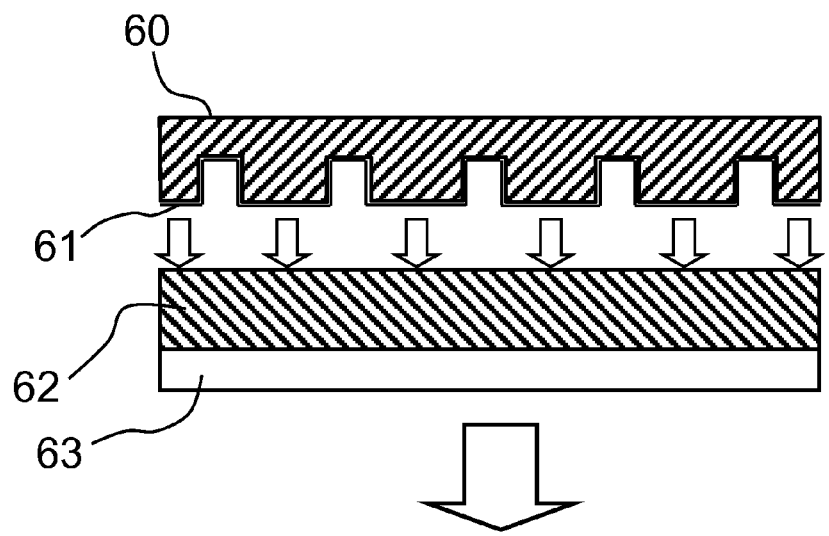
FIGS. 7A-7C depict a schematic representation of a process for manufacturing a backbone structure using a subtractive stamping process, according to an embodiment of the invention.
Figure 7B:
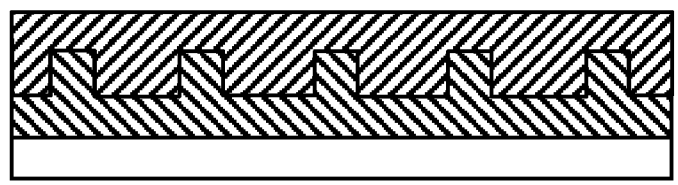
Figure 7C:
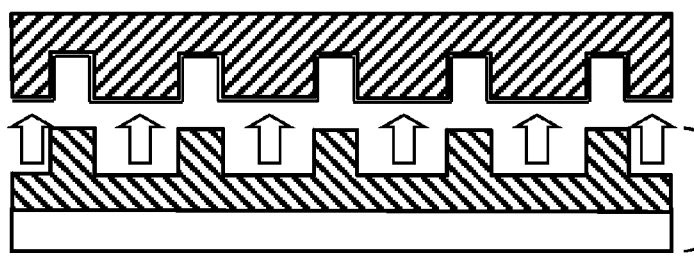

FIGS. 7A-7C depict a schematic representation of a process for manufacturing a backbone structure using a subtractive stamping process according to certain embodiments. A mandrel 60 is pre-fabricated with patterns that are inverted from a desired backbone pattern, and the mandrel 60 is coated with a thin release layer 61 that may be used to facilitate removal of the mandrel 60 after processing. The release layer 61 may be, for example, an organic material that may be vapor-deposited uniformly into three-dimensional features. This material may have additional properties of having either poor adhesion or the ability to be selectively etched without etching the mandrel 60 or a backbone material. For example, a stainless steel mandrel coated with a thin layer of copper deposited by chemical vapor deposition may act as an adequate stamping device for a process where a material that is used as a mold is thermally curable photoresist (see FIG. 7A). The combination of the mandrel 60 and the release layer 61 is contacted with a sheet of moldable material 62 that is on top of a substrate 63. Pressure is applied in order to transfer the pattern to the moldable material 62 (see FIG. 7B). This combination is hardened by curing into place the moldable material 62 using temperature or other means, such as light, in case the substrate 63 is transparent. The release layer 61 is removed by suitable means while separating the mandrel 60 and the resulting backbone structure 64 that includes the molded material and the substrate (see FIG. 7C).

In certain other embodiments of the invention, additive processes may be used to process a backbone structure of an energy storage device. FIGS. 8A-8D depict a schematic representation of a process for manufacturing the backbone structure using an additive electrochemical deposition process according to certain embodiments. This process may be referred to as a LIGA process in the art, which in German stands for "lithography, galvano-forming and molding (Abformung)." In this process, a conductive or non-conductive substrate 70 is used. In case of a non-conducting substrate, a conducting layer 71 is deposited. Photoresist 72 is coated on top of this substrate 70, and is patterned by standard lithography techniques using a photomask 73 to leave behind the photoresist 72 in areas where a backbone material is not to be deposited (see FIGS. 8A and 8B). The workpiece is placed in an electroplating bath with a potential enough to reduce metallic ions present in solution to form a metal 74 (see FIG. 8C). The metallic ions are reduced at a conductive surface and are not deposited where the photoresist 72 is present. When the process is substantially complete, the workpiece including components 70, 72, and 74 is removed from a plating cell, and the photoresist 72 is removed to leave the backbone structure (including components 70 and 74) behind (see FIG. 8D).

The following example further explains concepts described with reference to FIGS. 8A-8D. In this process, a silicon wafer may be used as the semi-conductive substrate 70. Copper may be deposited using sputter deposition to create the conductive layer 71 on top of the silicon. A positive or negative tone photoresist 72 (e.g., AZ4620™ or AZP4620™) may be coated on top of this substrate 70 and patterned by standard lithography techniques to leave behind the photoresist 72 in areas where a backbone material is not to be deposited. This workpiece may be placed in a nickel electroplating bath including 1 M nickel sulfate, 0.2 M nickel chloride, 25 g/l boric acid, and 1 g/l sodium saccharin, along with a platinum counter electrode and a potential enough to reduce nickel ions present in the solution to Ni metal 74. The metal ions are reduced at a conductive surface and are not deposited where the photoresist 72 is present. When the process is substantially complete, the workpiece including the silicon wafer 70, photoresist 72, and nickel metal 74 may be removed. Subsequently, the photoresist 72 may be removed using N-methyhl-2-pyrrolidone to leave the backbone structure including components 70 and 74 behind. The remaining copper metal in the area where the photoresist 72 was present may be removed by a chemical etch involving 2% sulfuric acid and 1% hydrogen peroxide.

FIGS. 9A-9E depict a schematic representation of a process for manufacturing a backbone structure using an additive extrusion process according to certain embodiments. A mandrel 80 is pre-fabricated with patterns that are inverted from a desired backbone pattern, and the mandrel 80 is coated with a thin release layer 81 that may be used to facilitate removal of the mandrel 80 after processing (see FIG. 9A). This mandrel 80 also has openings either at the edges or on top of each opening 85 in order to facilitate the addition of a material that may be made into a mold. The release layer 81 may be, for example, an organic material that may be vapor-deposited uniformly into three-dimensional features. This material may have additional properties of having either poor adhesion or the ability to be selectively etched without etching the mandrel 80 or a backbone material. For example, a stainless steel mandrel coated with a thin layer of copper deposited by chemical vapor deposition may act as an adequate stamping device for a process where a material that is used as the moldable material 82 is a thermally curable photoresist. The combination of the mandrel 80 and the release layer 81 is contacted with a substrate 83 (see FIG. 9B). The moldable material 82 is extruded into the openings 85 and filled (see FIG. 9C). Any residual material within the openings 85 is cleaned out at this time (see FIG. 8D). This combination is hardened by curing into place the moldable material 82 using temperature or other means, such as light, in case the substrate 83 is transparent. The release layer 81 is removed by suitable means while separating the mandrel 80 and the resulting backbone structure 84 that includes the molded material 82 and the substrate 83 (see FIG. 9E). Depending on the requirements of each particular implementation, release layer 81 may not be necessary (e.g., if the mandrel/mold 80 itself satisfies the required characteristics that would otherwise be satisfied by a release layer). In certain embodiments, the mandrel/mold 80 may be released by dissolution.

Figure 10A:
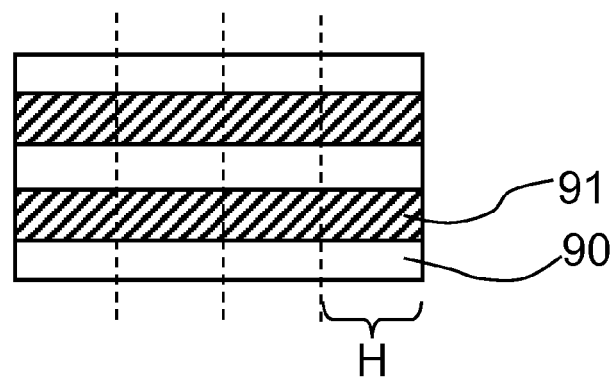
FIGS. 10A-10C depict a schematic representation of a process for manufacturing a backbone structure using a sequential deposition and assembly process, according to an embodiment of the invention.
Figure 10B:
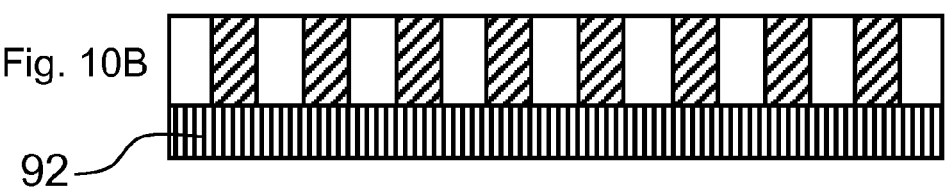
Figure 10C:
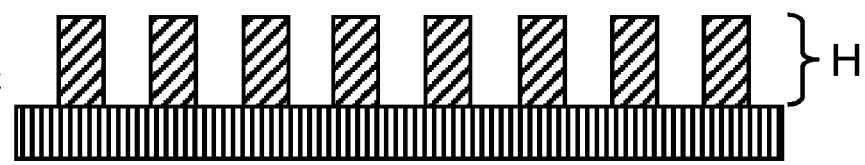

FIGS. 10A-10C depict a schematic representation of an exemplary process for manufacturing a backbone structure using a sequential deposition and assembly process according to certain embodiments. In this process, alternating layers of backbone material and a sacrificial material are assembled. An example of a set of materials that may be assembled together are sheets of polyethylene terephthalate (PET) 90 interspersed with copper foils 91. The resulting stack thus includes PET/copper/PET/copper/PET (see FIG. 10A). The layers are diced to a thickness substantially corresponding to a height of a backbone structure $\underline{H}$, spirally wound within their axes, and assembled onto a substrate 92 using epoxy glue (see FIG. 10B). A sacrificial PET layer is removed by selectively etching it away in a selective chemical etch solution containing sodium hypochlorite (NaOCl). This leaves behind two spirally wound copper substrates, one for cathode backbone and another for anode backbone with gaps in the middle which will house active materials and separators for an electrochemical energy device (see FIG. 10C).

Once a backbone structure is available, materials that are involved in electrochemical reactions, also called active materials, may be loaded onto the backbone structure. This may be done by several different methods. An anode backbone and a cathode backbone may be separate from each other, but each electrode may be electrically conductive by itself. This lends to electrochemical deposition techniques and electrophoretic deposition techniques as viable options for adding the active materials. For example, in the case of a lithium-ion battery, a cathode material, such as $LiCoO_2$, $LiNi_{0.5}Mn_{1.5}O_4$, $Li(Ni_xCo_yAl_z)O_2$, $LiFePO_4$, or $Li_2MnO_4$ may be electrophoretically deposited onto a conductive substrate. Electrophoretic deposition may also be performed for $V_2O_5$ films. Cathode materials may also be co-deposited along with a polypyrrole matrix. In addition, certain cathode materials for lithium-ion batteries may be electrochemically deposited, such as molybdenum oxysulfides. In certain embodiments, cathode formation comprises electrophoretic deposition of $LiCoO_2$ until a layer thickness between 1 micron and 300 microns is formed. In certain embodiments, the layer thickness is between 5 microns and 200 microns, and in certain embodiments, the layer thickness is between 10 microns and 150 microns. With regards to silicon anode materials, electrophoretic deposition may be used to assemble particulates containing silicon. Other deposition processes for silicon materials include but are not limited to chemical vapor deposition, physical vapor deposition, and silk screen. Similar layer thicknesses apply to anode formation as described above. The silicon particulates can include alloys. Electrochemical deposition alternately may be used for plateable anode materials, such as tin, graphite, and an electrophoretic resist deposition followed by pyrolysis may be used to form a carbon anode. Other suitable anode materials may include titanates, silicon, and aluminum. Suitable separator materials may include polyethylenes, polypropylenes, $TiO_2$, $SiO_2$, $Al_2O_3$, and the like.

Silicon may be used as a negative electrode material, including in lithium batteries. Such use may be beneficial due to the large gravimetric and volumetric capacity of silicon for lithium. However, charging of silicon with conventional non-aqueous electrolytes may be problematic, because the voltage of the silicon with respect to lithium may become zero unless relatively low current densities are used in charging the silicon. This is undesirable since at zero volts, lithium metal deposition could take place and lead to safety problems and poor cycle life. This may not be a severe problem for conventional pasted electrodes because the particulates provide a relatively high surface area to volume ratio. Similarly, for thin film silicon electrodes made by chemical vapor deposition (for example, see US 2009/0226983) the low current density required for charging may not see a severe problem. However, for monolithic, three-dimensional electrodes such as those described in WIPO Patent Application WO/2008/089110 "THREE-DIMENSIONAL BATTERIES AND METHODS OF MANUFACTURING THE SAME", the low charging current density permitted by silicon may result in an excessive charging time, especially on the first formation cycle.

We have found surprisingly that the charging rate of silicon anodes can be significantly increased by replacing the commonly used lithium hexafluorophosphate ($LiPF_6$) salt with another salt such as lithium (bis)trifluoromethanesulfonimide ($LiN(CF_3SO_2)_2$ or LiTFSI). This invention may be of particular value in three-dimensional battery structures where monolithic silicon anodes are extremely advantageous. $LiPF_6$ forms fluorine-containing film at the silicon surface that is highly resistive. $LiPF_6$ tends to disproportionate to give LiF and $PF_5$ that readily form fluorinated films. Therefore, salts that do not release fluorine may be effective in allowing high charging rates of silicon. For example, salts such as LiTFSI ($LiN(CF_3SO_2)_2$), lithium trifluoromethanesulfonate ($LiCF_3SO_3$), lithium perchlorate ($LiClO_4$), and lithium bis(oxalate)borate (LiBOB) may allow high charging rates for silicon. Salts that do not readily release fluorine can be used alone or in combination to provide the benefit. Such salts can be used in a variety of three-dimensional battery structures. The battery structures can involve three-dimensional anodes and cathodes, or a three-dimensional anode paired with a planar cathode, or a three-dimensional cathode paired with a planar anode.

EXPERIMENTAL RESULTS

Unexpectedly, the use of the lithium (bis)trifluoromethanesulfonimide (LiTFSI) salt allowed a more than twofold increase in charging current without the silicon voltage going to zero compared to the use of lithium hexafluorophosphate ($LiPF_6$) salt. The fast charging capability enabled by the use of the LiTFSI salt makes more practical the use of silicon anodes, especially monolithic silicon electrodes that have limited surface area. Further, the faster charging lowers the cost of making silicon-containing batteries because the production time is lowered.

A pouch cell was made as follows. A piece of silicon (~½ inch×½ inch) was enveloped in a nickel mesh and placed in a pouch on one side of two pieces of Celgard 2320 separator; a piece of lithium foil was placed on the other side of the separator. Electrolyte was added to the pouch and then it was heat sealed. For each of the electrolytes listed in FIG. 11, two cells were made. The cells were charged starting at 50 microamperes, and then the current was progressively increased (to 100, 150, 200, 250, 300, 350, 400, 450, to a maximum of 500 microamperes) until a voltage cutoff of 5 mV was reached. The results are shown in FIG. 12. Comparing experiments 3 with 7 demonstrates that the LiTFSI salt allow for a much higher charging current than the $LiPF_6$ salt.

The LiTFSI salt is more chemically stable than $LiPF_6$. $LiPF_6$ can disproportionate to $PF_5$ and LiF, and one of these species may react with the silicon to form a resistive film. Since the LiTFSI does not generate reactive species, it may not lead to formation of a resistive film on the silicon. Other salts, such as $LiClO_4$ and $LiCF_3SO_3$, LiBOB, which also do not generate reactive species, may behave like the LiTFSI salt. Salts like $LiBF_4$, which do generate reactive species, may behave like $LiPF_6$.

The use of the LiTFSI salt with a silicon electrode may enable higher currents than with conventional $LiPF_6$ electrolytes. This may lower the cost of making batteries because they can be charged in a shorter time at higher current. Before leaving the factory, batteries must typically be charged at least once and this operation is expensive because of the capital investment in charging equipment and the time required for charging. Fast charging reduces the charging time and so increases the throughput, lowering the cost of making batteries. Another advantage of using the LiTFSI salt is that it enables an increase in power of the battery over $LiPF_6$.

While some embodiments have been described with reference to energy storage devices, it should be recognized that the backbone structures described herein may be useful in various other types of devices to provide increased surface area per unit geometrical area (or per unit weight or volume). These other types of devices may involve various types of processes during their operation, such as heat transfer, chemical reactions, and diffusion.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A three-dimensional battery, comprising:
a plurality of three-dimensional electrodes, the plurality of electrodes including a plurality of cathodes and a plurality of monolithic silicon anodes arranged in an alternating sequence,
wherein the three-dimensional electrodes comprise protrusions having a length (L) defined in a first direction and a thickness (T) defined in a second direction that is orthogonal to the first direction, with T<L, and wherein the plurality of cathodes and the plurality of monolithic silicon anodes alternate in a direction generally parallel to the second direction; and
an electrolyte solution in fluid contact with the plurality of electrodes, wherein the electrolyte solution comprises an electrolyte salt consisting essentially of LiTFSI.

2. The battery of claim 1, wherein the ratio of the surface area of the three-dimensional electrodes to their geometric footprint is greater than approximately 2.

3. The battery of claim 1, wherein the ratio of the surface area of the three-dimensional electrodes to their geometric footprint is between about 2 and about 1000.

4. A method for manufacturing the three-dimensional battery of claim 1, comprising:
providing a first structural layer, said structural layer having a first surface;
forming a first plurality of conductive protrusions extending from said first surface of said first structural layer;
forming a first plurality of electrodes extending from said first surface of said first structural layer, the first plurality of electrodes comprising a plurality of silicon anodes, wherein each of the first plurality of electrodes contacts the outer surface of one of said first plurality of conductive protrusions; and
providing the electrolyte solution in fluid contact with the first plurality of electrodes.

5. The method of claim 4, wherein forming the plurality of silicon anodes comprises forming a plurality of silicon anodes by reactively etching a silicon substrate.

6. The method of claim 4, wherein forming the plurality of silicon anodes comprises forming a plurality of silicon anodes by electrophoretic deposition of silicon-containing particulates.

7. The method of claim 5, wherein the step of forming each of said anodes comprises reactive etching the silicon substrate to a depth of between approximately 0.1 micron and approximately 1000 microns is formed.

8. The method of claim 6, wherein the step of forming each of said anodes comprises electrophoretic deposition of silicon until a layer thickness between approximately 0.1 micron and approximately 1000 microns is formed.

9. The method of claim 4, further comprising:
providing a second structural layer, said second structural layer having a second surface substantially opposing said first surface;
forming a second plurality of conductive protrusions extending from said second surface of said second structural layer and substantially parallel to said first plurality of conductive protrusions; and
forming a second plurality of electrodes, wherein each of said second plurality of electrodes contacts the outer surface of one of said second plurality of conductive protrusions.

10. The method of claim 9, wherein forming the second plurality of electrodes comprises forming a plurality of cathodes.

11. The method of claim 9, wherein the second plurality of electrodes protrude among corresponding ones of the first plurality of electrodes.

12. The three-dimensional battery of claim 1, wherein a maximum current for a first charging cycle of the battery with the electrolyte solution comprising the electrolyte salt consisting essentially of LiTFSI is at least 2.5 times a maximum current for a first charging cycle of the battery with an electrolyte solution comprising an electrolyte salt that is $LiPF_6$ in place of LiTSFI.

* * * * *